No. 650,875. Patented June 5, 1900.
D. U. STONER.
DEVICE FOR CONTROLLING HORSES.
(Application filed Oct. 5, 1899.)
(No Model.)
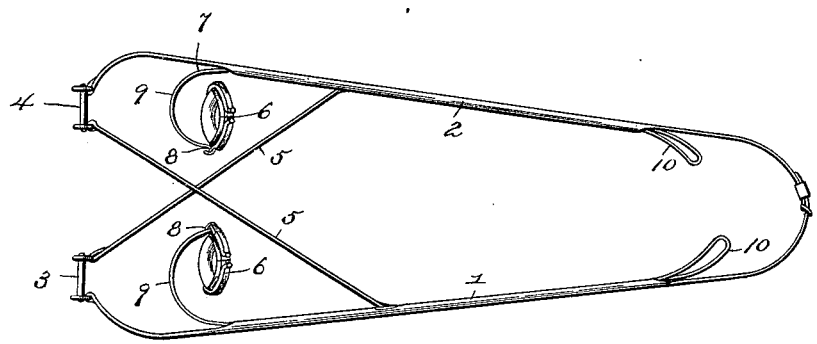
Witnesses
David U. Stoner, Inventor.
By his Attorneys,

UNITED STATES PATENT OFFICE.

DAVID U. STONER, OF MOUNT JOY, PENNSYLVANIA.

DEVICE FOR CONTROLLING HORSES.

SPECIFICATION forming part of Letters Patent No. 650,875, dated June 5, 1900.

Application filed October 5, 1899. Serial No. 732,624. (No model.)

*To all whom it may concern:*

Be it known that I, DAVID U. STONER, a citizen of the United States, residing at Mount Joy, in the county of Lancaster and State of Pennsylvania, have invented a new and useful Device for Checking and Controlling Runaway or Vicious Horses, of which the following is a specification.

This invention relates to harness, and has for one object to provide improved means for checking and controlling runaway and vicious horses and is especially designed to choke or cut off the breath of the animal, thereby bringing him under control.
A further object is to arrange the device in convenient reach of the driver, so that the device may be operated without dropping the reins, and, finally, to arrange the device for application to a double harness without changing the latter in any manner whatsoever.

With these and other objects in view the present invention consists in the combination and arrangement of parts, as will be hereinafter more fully described, shown in the accompanying drawing, and particularly pointed out in the appended claims, it being understood that changes in the form, proportion, size, and minor details may be made within the scope of the claims without departing from the spirit or sacrificing any of the advantages of the invention.

In the drawing there is illustrated a plan view of the present invention applied to a double harness.
Referring to the drawing, 1 and 2 designate the opposite reins of a double harness, which are connected to the outer ends of the respective bits 3 and 4, and also to the inner ends of the opposite bits, by means of the short crossed rein-sections 5, as is common in all double harness. Between the respective reins and the adjacent portions of the crossed sections thereof are the harness-collars 6. These parts are common and well known and have been shown to more fully illustrate the application and operation of the present device.

In carrying out the invention I employ a flexible cord or connection 7, which has one end connected to the inner side of the collar, as indicated at 8, and then looped transversely across the front thereof, so as to form a throat-engaging device 9. The opposite free portion of the cord is mounted to move longitudinally upon the adjacent rein and has its rear extremity 10 formed into a loop or hand-grasp, which is located in convenient reach of the driver. It is preferable to form the intermediate portion of the rein tubular, so as to slidably receive the cord and support the latter out of engagement with other parts of the harness, and thereby insure a proper operation of the device. It will be understood that each rein and collar is provided with a similarly-arranged cord, so that the devices may be simultaneously operated or individually, as may be desired.

In the operation of the device either or both of the hand-grasps 10 are operated to draw rearwardly upon the flexible cords or connections, thereby drawing the throat-engaging devices or loops 9 tightly against the throats of the animals to choke the latter and bring them under control. As the cords pass through the reins the latter are not dropped when the choking device is being operated and may be conveniently resumed to guide the animals after they have been brought under control.

In some instances it may be well to form the throat-engaging loops or portions of wire, which is stronger than the cord and will better withstand the rubbing action against the neck of the animals, or a metal bar may be employed, the latter requiring less pressure to choke the animals. Also a flat leather strap may be used to form the loop. If cord is employed, it should be oiled or otherwise treated to withstand the effects of the weather, so as not to rot.

What is claimed is—

1. In a device for checking and controlling horses, the combination with a pair of reins, and a pair of harness-collars, of flexible connections movable longitudinally upon the reins, the forward end of each connection being secured to the inner side of the adjacent collar, and formed into a loop extending horizontally across the front of the collar.

2. In a device for checking and controlling horses, the combination with a pair of reins, and a pair of harness-collars, of throat-engaging devices connected to the inner sides of the respective collars and extending outwardly in opposite directions across the fronts thereof, and opposite flexible connections mounted to move longitudinally upon the respective reins, and also connected to the outer free ends of the respective throat-engaging devices.

In testimony that I claim the foregoing as my own I have hereto affixed my signature in the presence of two witnesses.

DAVID U. STONER.

Witnesses:
D. CAMERON STONER,
PHILIP J. DIETER.